(No Model.) 6 Sheets—Sheet 2.

A. V. KISER.
CORN HARVESTER.

No. 459,006. Patented Sept. 8, 1891.

WITNESSES:
W. L. Wood
F. M. Jones

INVENTOR
Alvie V. Kiser
BY Staley and Shepherd
ATTORNEYS (No Model.) 6 Sheets—Sheet 3.

A. V. KISER.
CORN HARVESTER.

No. 459,006. Patented Sept. 8, 1891.

WITNESSES:
W. L. Wood
F. M. Jones

INVENTOR
Alvie V. Kiser
BY
ATTORNEYS (No Model.) 6 Sheets—Sheet 4.

A. V. KISER.
CORN HARVESTER.

No. 459,006. Patented Sept. 8, 1891.

(No Model.) 6 Sheets—Sheet 5.

A. V. KISER.
CORN HARVESTER.

No. 459,006. Patented Sept. 8, 1891.

WITNESSES:

INVENTOR

BY

ATTORNEYS

UNITED STATES PATENT OFFICE.

ALVIE V. KISER, OF WEST LIBERTY, OHIO.

CORN-HARVESTER.

SPECIFICATION forming part of Letters Patent No. 459,006, dated September 8, 1891.

Application filed January 26, 1891. Serial No. 379,190. (No model.)

*To all whom it may concern:*

Be it known that I, ALVIE V. KISER, a citizen of the United States, residing at West Liberty, in the county of Logan and State of Ohio, have invented certain new and useful Improvements in Corn-Harvesters, of which the following is a specification.

My invention relates to improvements in corn-harvesters, and it especially relates to the devices for cutting, gathering, and bundling the corn and delivering the same from the machine in the form of a shock.

My invention consists in the various constructions and combinations of parts hereinafter described, and pointed out in the claims.

In the accompanying drawings, which form a part of this specification.

Like parts are indicated by similar letters of reference throughout the several views.

Figure 3:
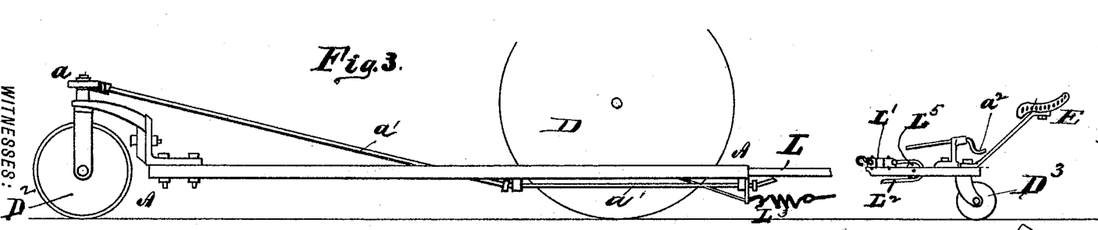
Fig. 3 is a diagram view showing the arrangement of the hitch and the steering or guiding devices.

In the said drawings, A A represents the main frame, from which all of the operating parts are supported; B B, the gathering frames or platforms supported on said main frame; C, revolving shock-forming platform or table, also supported on said main frame. The main frame A A is supported on carrying-wheels D D', from which the power to drive the operating parts is obtained, the front part of the main frame being further supported by a movable caster-wheel $D^2$, adapted to be operated by a suitable worm-gear $a$ through a tumbling-shaft $a'$, which extends back to the rear of the machine, and is operated by a crank $a^2$, which is arranged in proximity to the seat E of the driver. (See Fig. 3 for detail.)

Each of the gathering-platforms B B is provided at the end with suitable revolving gathering-arms $B'$ $B^2$, $B'$ of which is preferably arranged so as to revolve in a horizontal plane and $B^2$ in a vertical plane, so as to engage the standing stalks of corn or pick up the "down" corn and direct it to the revolving cutters F, which are located immediately in the rear of said gathering-arms and adapted to be moved against the standing corn as the machine is advanced in a forward direction and sever the same, in the manner hereinafter more fully specified. From the cutters F the corn or stalks are carried to the rear in a vertical position by horizontal revolving endless toothed chains $B^3$, two of which are preferably used, one above the other, and adapted to act in connection with a stationary guide $B^5$, which extends backwardly parallel with and in proximity to the said chain to the rear of the gathering-platform B.

It will be understood that there are two gathering-platforms B B, which extend backwardly from the front of the machine to a point slightly in the rear of the vertical shaft $b$, each provided with cutting devices, gathering-arms, and carrying-chains, each one adapted to receive and cut one row of corn. To provide for adjusting the distance between the respective cutting devices, so as to adapt the machine to corn-rows of different widths apart, I construct the gathering-platforms B independent of the main frame and secure the same thereto by adjustable connections, to permit the gathering-platforms to be moved to or from each other, as the case may be. This I preferably accomplish by hinging each of the platforms B about the rear vertical shaft $b$ of the carrying-chains $B^3$, and provide a slotted yoke or extension $b'$ on each carrying-platform, adapted to be secured to the main frame by a fastening-bolt $b^2$, which extends through said slotted extension and thus furnishes the means for holding the front ends of the gathering-platforms in different positions with reference to the main frame A A, the rear part of each of said platforms being adapted to turn upon the shaft $b$, but otherwise occupy the same position with reference to the other parts of the machine.

Figures 1, 13, 14, 20:
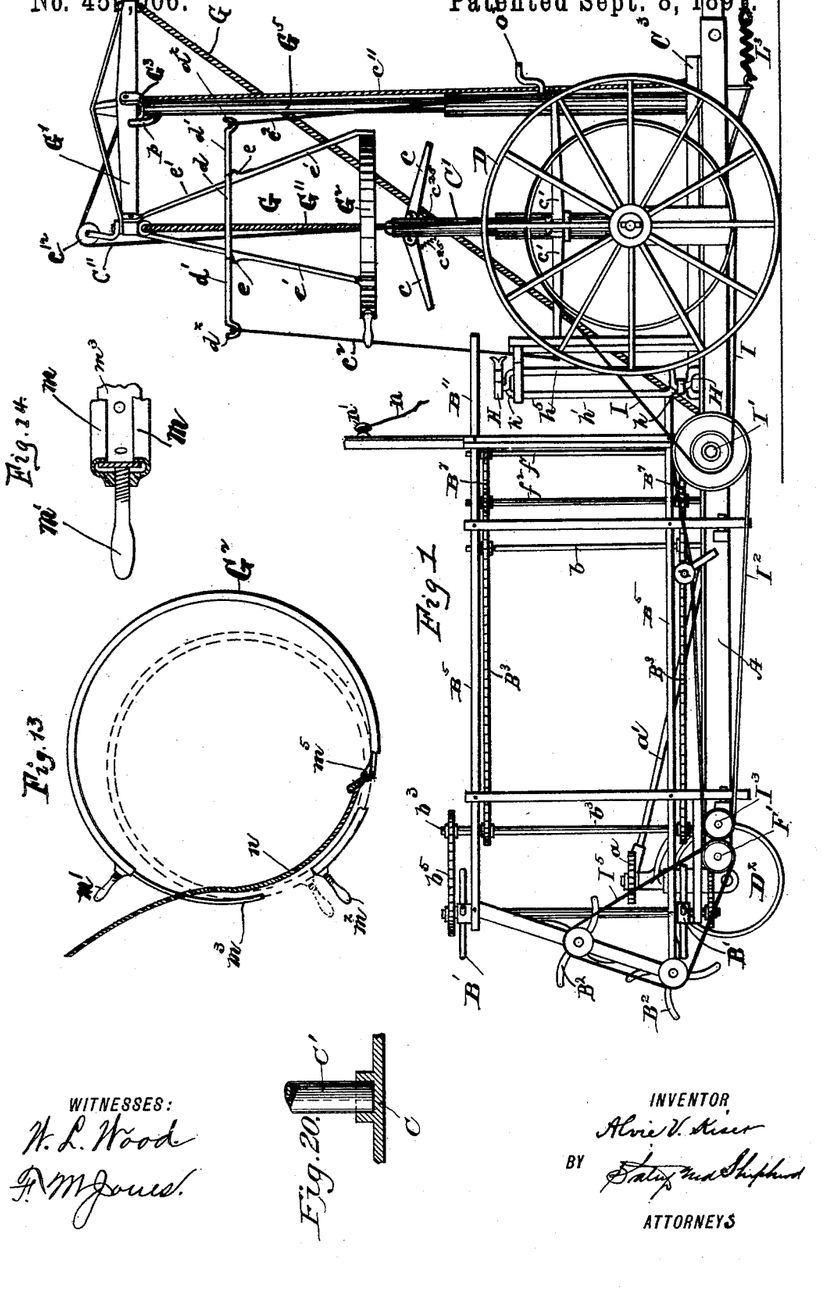
Figure 1 is a side elevation of a machine embodying my invention.
Figs. 8, 9, 10, 11, 12, 13, and 14 are details of the bunching or shock-forming devices.
Fig. 20 is a detail of platform, showing socket for supporting-post.
Figure 2:
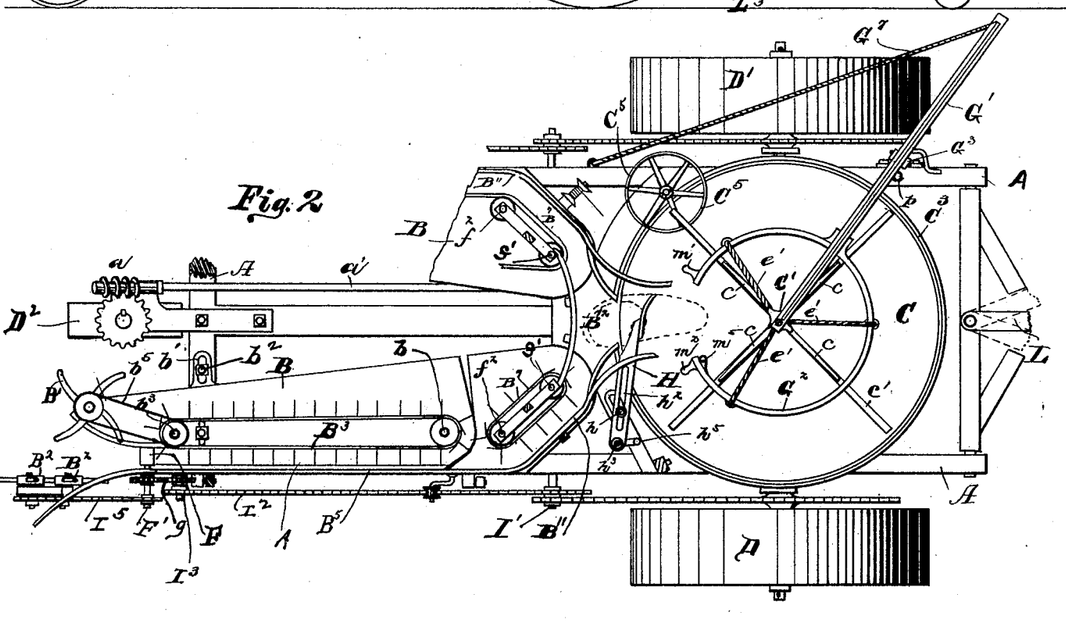
Fig. 2 is a partial plan view of the same, a portion of the machine which would be a duplicate of that part shown in the drawings being broken away in this figure.
Figures 8, 9, 10, 10A, 11, 12:
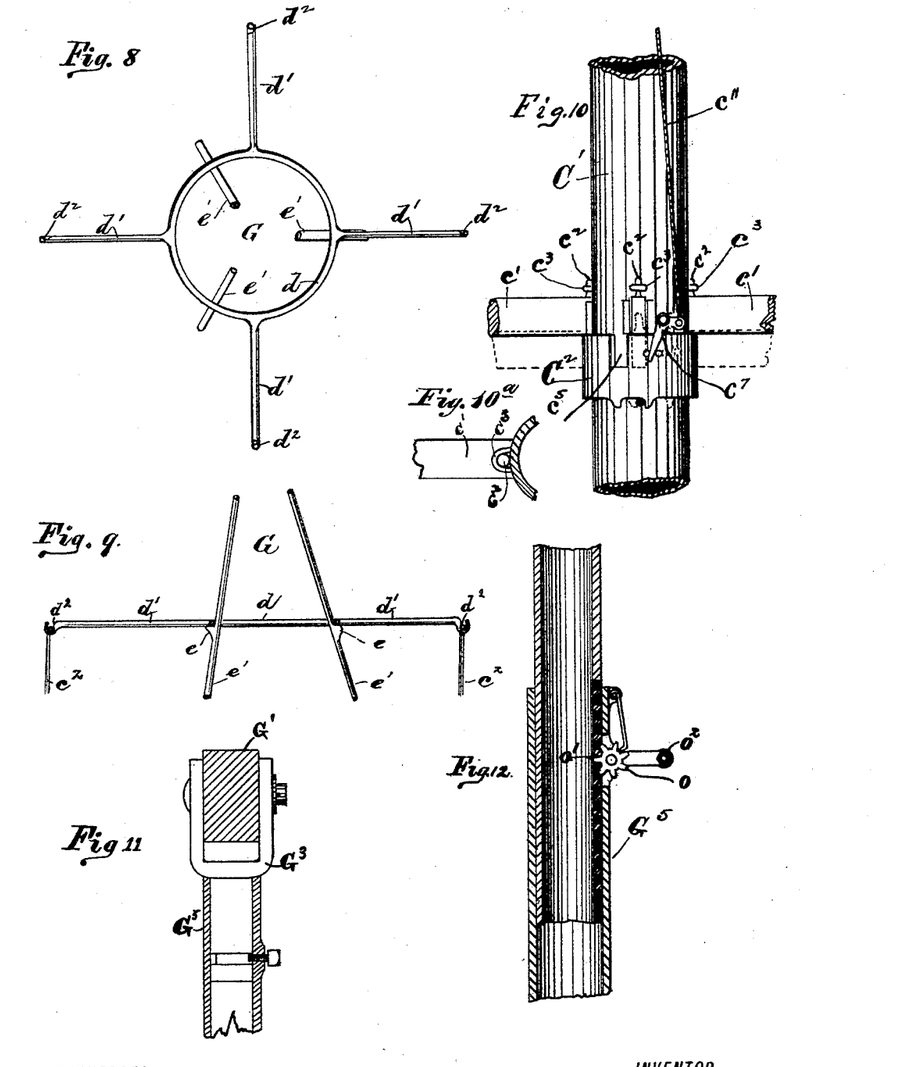

Extending backwardly and inwardly from a point in proximity to the vertical shaft $b$ on the gathering-platform are auxiliary carrying-chains $B^7$, preferably arranged in the same or substantially the same horizontal planes with the carrying-chains $B^3$, said chains being adapted to move in a direction at an angle to the main carrying-chains and operated in connection with stationary curved guides $B^{11}$ to deliver the corn from the respective gathering-platforms to a common point on the main platform $B^{12}$ about midway between said gathering-platforms and at a point immediately in front of the bundling or shocking platform C. This platform C is circular in form and adapted to revolve on a shaft or trunnion $h^4$, and is substantially divided into four sections by means of stationary projecting arms $c\ c$ and detachable radial projecting arms $c'\ c'$, each of said arms extending outwardly from a central post C', and the arms of the respective sets being arranged in same vertical plane. The upper stationary arms $c$ are made comparatively short and are preferably arranged at an angle to the central post C', as shown in Fig. 1, the said arms being adapted to extend slightly downwardly as well as outwardly from the said post. The lower detachable radial arms $c'$ are suspended at their outer ends by flexible cords $c^2$ from a supporting-ring $d$, which rest in projecting lugs $e$ on a normally stationary skeleton frame G. This supporting-ring $d$ (see Figs. 8 and 9 for detail) is provided with extending arms $d'$, corresponding to the detachable radial arms $c'$, each of said extending arms being provided with a hook-shaped end $d^2$, adapted to receive the cord which supports the outer extremity of the lower detachable radial arm.

The frame G consists, essentially, of supporting-rods $e'$, each connected at its upper end to a hinged or oscillating-beam G' and supports at its lower end a normally-open ring $G^2$, the opening or mouth of said ring being located opposite to and above the point $B^{12}$, at which the incoming corn from the respective gathering-platforms is converged. From the point $B^{12}$ the corn is delivered into the respective subdivisions of the platform C, between the projecting arms, by the reciprocating packers H, in a manner hereinafter more fully described, the tops or upper ends of the cornstalks being adapted to pass through the opening in the ring $G^2$, and thus enter the same.

Means are provided for varying the stroke of the packers H as the respective sections of the platform are filled, and also, when one of said sections is filled, to move the platform one-fourth of a revolution, so as to bring the new section opposite the point of discharge thereto. As the platform is revolved the upper ends of the stalks thereon are carried within the normally-stationary ring $G^2$, and the corn thus held therein between the respective projecting arms until the platform is completely filled, when the shock is bound and discharged, in the manner hereinafter more fully described.

As before stated, the power to drive the different operating parts is obtained from the carrying-wheels D and D', preferably by means of the main driving-chains I, which, operating over suitable sprocket-wheels, transmit a rotary motion to a transverse shaft I', supported upon the main frame A A below the respective platforms. (See Fig. 4.) The auxiliary carrying-chains $B^7$ are driven from the shaft I' by beveled gears $f$, arranged, respectively, on said shaft and on vertical shafts $f'$, which drive said carrying-chains. The said carrying-chains operate to transmit the motion to the vertical shafts $f^2$, which are supported parallel to the vertical shafts $f'$, on which are located the other supporting-sprockets for said chains. These vertical shafts $f'$ $f^2$ are supported in suitable bearings located on the main frame A A.

Figure 4:
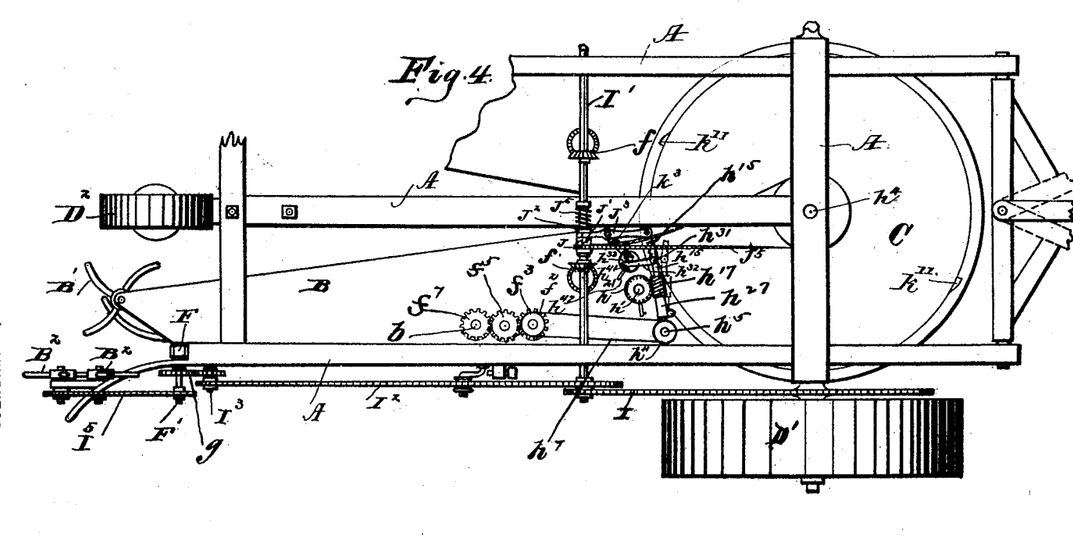
Fig. 4 is a partial bottom plan view, being practically the under side of Fig. 2.

Located upon the shaft $f^2$, below the platform, as shown in Fig. 4, is a spur-gear $f^3$, engaging with an intermediate gear $f^5$, journaled on a suitable stud on the bottom of the main platform, which meshes with a spur-gear $f^7$ on the vertical shaft $h$ of the main carrying-chains. From this shaft motion is transmitted to the vertical shaft $b^3$ at the outer end of the gathering-frames B, the gathering-arms B' being revolved from the shaft $b^3$ by a suitable chain $b^5$.

The power to drive the cutters F is preferably obtained from the transverse shaft I' by a drive-chain $I^2$, which transmits the motion of said shaft to a counter-shaft $I^3$, the cutter-shaft F' being revolved from the counter-shaft $I^3$ by spur-gears $g$ to secure the proper direction of revolution. From the cutter-shaft F' a drive-chain $I^5$ passes over suitable sprocket-wheels to impart motion to the vertical gathering-arms $B^2$.

The reciprocating packers H are each supported on a crank $h$, formed on a vertical shaft $h'$, which crank passes through a slotted opening $h^2$ in the packer-arm. A reciprocating oscillating motion is imparted to the packer-arm by a crank $h^3$ on a vertical shaft $h^5$, the shaft $h^5$ being revolved from the shaft $f^2$ by a suitable drive-chain $h^7$, arranged below the platform, as shown in Fig. 4.

Figure 15:
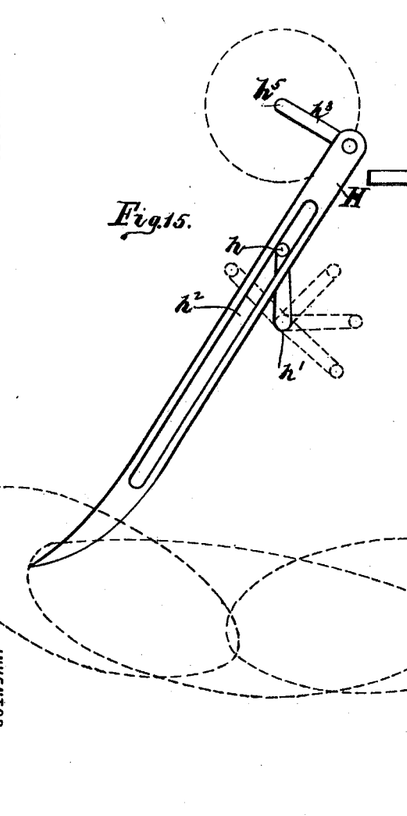
Figs. 15, 16, 17, and 18 are details of the packers and the devices for operating the same to deliver the corn and stocks onto the bundling or shock-forming platform.
Figure 17:
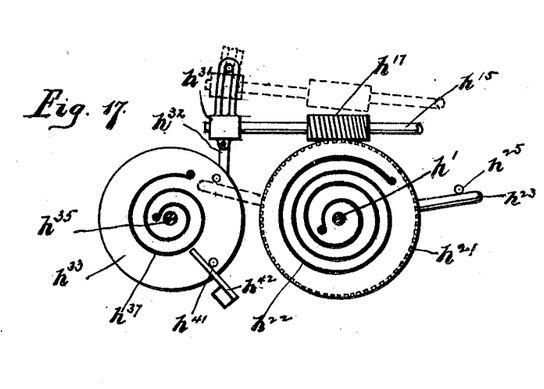
Figure 18:
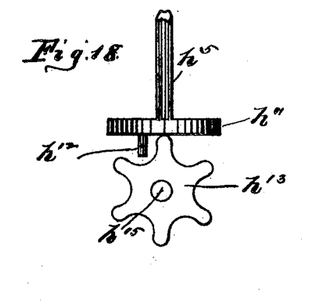

To provide for changing the movement of the outer end of the packer-arms and to vary the travel of the same toward the central post of the shocking-platform, I provide means for gradually revolving the shaft $h'$, through a part of a revolution, and thus change the pivotal point of the said packer-arms and cause the same to travel in different paths, as indicated by dotted lines in Fig. 15. This is preferably accomplished in the following manner: The crank-shaft $h^5$ is provided below the platform with a crank-wheel $h^{11}$, having a projecting stud $h^{12}$, adapted to contact with the teeth of a star-wheel $h^{13}$, arranged on a revolving shaft $h^{15}$, which carries a worm $h^{17}$. (See Figs. 4, 17, and 18 for detail.) The worm $h^{17}$ is adapted to engage with a worm-gear $h^{21}$, secured to the crank-shaft $h'$, also below the platform. Arranged adjacent to the worm-gear $h^{21}$ and connected at one end thereto and at the other to the main frame A is a spiral spring $h^{22}$, adapted to be compressed as the shaft $h'$ is revolved by the worm-wheel $h^{21}$. Means are provided for throwing the worm $h^{17}$ out of contact with the worm-gear $h^{21}$, when the crank-shaft $h'$ is moved a half-revolution. The shaft, being thus released, is returned to its normal position by the spring $h^{22}$, which has been compressed in the manner specified. The projecting arm $h^{23}$ on the worm-gear $h^{21}$, being adapted to come in contact with a stop-projection $h^{25}$ on the main frame, and thus limit the backward movement of said crank-shaft. The worm-shaft $h^{15}$ is supported at one end in a pivoted bearing $h^{27}$ and at the other in a sliding bearing $h^{31}$, the said sliding bearing $h^{31}$ being connected by a link $h^{32}$ to a revolving disk $h^{33}$, located on the under side of the platform in proximity to the worm-gear $h^{21}$ and adapted to revolve on the stationary stud $h^{35}$, arranged in the main frame. The disk $h^{33}$ is provided with a spiral spring $h^{37}$, connected at one end to said disk and at the other to the main frame and adapted to hold said disk in its normal position with a stop-pin $h^{41}$, resting against a stop projection $h^{42}$. The projection $h^{23}$ on the worm-gear $h^{21}$ is adapted, as said worm-gear is revolved, to come in contact with the stop-pin $h^{41}$ on said disk, and thus revolve said disk a portion of a revolution sufficient to move the worm $h^{17}$ out of engagement with the worm-gear $h^{21}$, as indicated in dotted lines in Fig. 17. When thus released, the worm-gear $h^{21}$ and the disk $h^{33}$ are each returned to their normal positions by springs connected thereto, the parts being thus re-engaged and the operation being repeated. It will be seen that by this arrangement the crank-shaft $h'$ is slowly revolved through a portion of its revolution, thus changing the pivoted center of the packer-arms H, causing the forward end thereof to move a less distance over the shocking platform or table, and thus compensate for the filling of the shock-sections by the incoming stalks.

Figure 16:
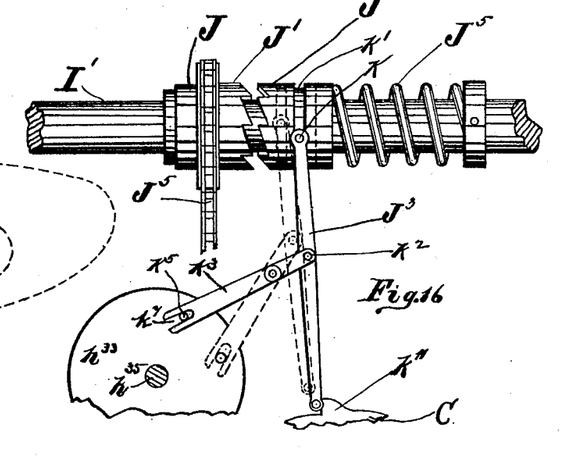

The mechanism is so timed that each shock-section is filled just prior to the time that the crank-shaft $h'$ is released and returned to its normal position, as before described. Means are provided for releasing the table or shocking-platform at the same time and causing it to revolve one-fourth of a revolution to bring a new section or division thereof opposite the reciprocating packers. This I preferably accomplish as follows: On the transverse shaft I' is located a sprocket-wheel J, normally disconnected from said shaft to permit said shaft to revolve therein, but provided on one side with a clutch-face J', adapted to be engaged by a sliding clutch-collar $J^2$, which, when engaged by said clutch-face, causes the sprocket-wheel to revolve with the shaft. The clutch-collar $J^2$ is normally held out of engagement with the sprocket-wheel by a shifting-lever $J^3$, and when released by said shifting-lever is thrown into engagement by a spring $J^5$, arranged on said shaft in a well-known manner. The shifting-lever $J^3$ is bifurcated at its outer end and provided with engaging-projections $k$, which rest in a peripheral groove $k'$ in the clutch-collar $J^2$ in a well-known manner. The shifting-lever is pivoted at $k^2$ to one end of a pivoted arm $k^3$, the other end of which is engaged by a pin $k^5$ on the disk-wheel $h^{33}$, said pin being adapted to operate in an elongated or slotted opening $k^7$ in the end of said arm. The sprocket-wheel J is connected by a suitable driving-belt $J^5$ to the shaft $h^4$ on the revolving table or shocking-platform C, so that when the clutch-collar $J^2$ engages with said sprocket-wheel the table or platform will be caused to revolve. The table or platform is provided at each division with an engaging projection $k^{11}$, (see Fig. 16 for detail,) adapted as said table is revolved to come in contact with the outer end of the shifting-lever $J^3$, and thus withdraw the clutch-collar from engagement with the sprocket-wheel J, thus releasing said sprocket-wheel and stopping the revolution of said table. As the disk-wheel is revolved in the manner before described, the pivoted arm $k^3$ produces a longitudinal movement of the shifting-lever $J^3$, as indicated by dotted lines in Fig. 16, thus withdrawing said lever from contact with the engaging projections $k^{11}$ on the table, thus releasing said table, and at the same time permitting the clutch-collar to engage with the sprocket-wheel to produce a further partial revolution of said table simultaneously with the return of the disk-wheel and the crank-shaft $h'$ to their normal positions, when the operation is repeated.

Figure 5:
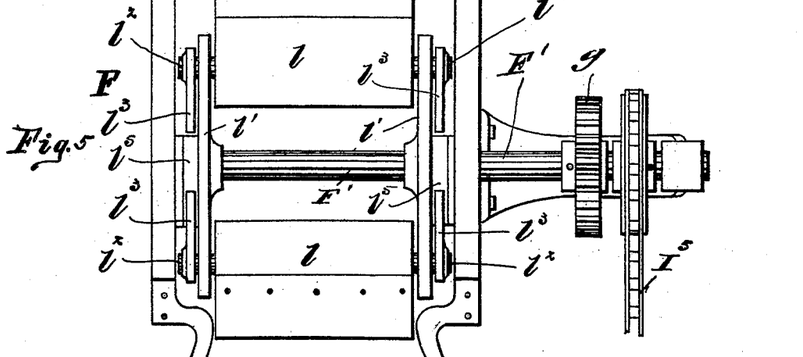
Figs. 5, 6, and 7 are details of the cutting devices.
Figure 6:
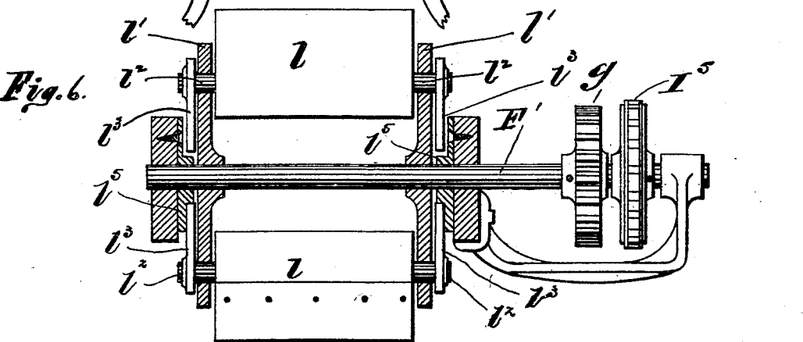
Figure 7:
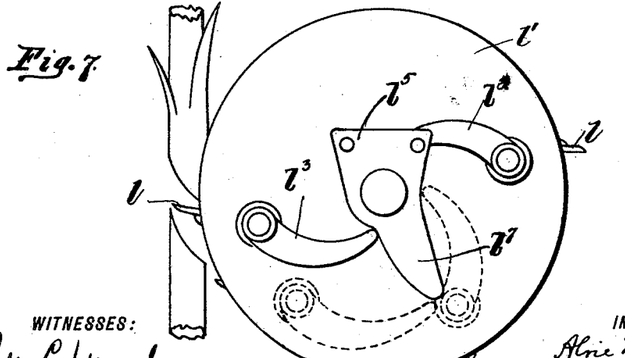

The cutters F (shown in detail in Figs. 5, 6, and 7) consist, essentially, of pivoted cutters $l$, pivoted or journaled at each end in supporting-disks $l'$, secured rigidly to and revolving with the cutter-shaft F', the cutters $l$ being arranged parallel with and adapted to revolve about said shafts. Trunnions $l^2$, on which said cutters are adapted to turn, are extended through the supporting-disks and each provided with a projecting arm or finger $l^3$, arranged on the opposite side of said disk from the cutters. Arranged at each end of each cutter adjacent to the respective supporting-disks are stationary cams $l^5$, each provided with an extended cam projection $l^7$, adapted to engage with the fingers $l^3$ on the cutting-knives and turn said knives on their trunnions $l^2$.

As before stated, the shaft F' is caused to revolve as the machine is moved against the standing corn, the direction of revolution being such that the cutters $l$ operate against the stocks with an upward and a forward movement. The cam projection $l^7$ is so arranged that just prior to engaging with the corn-stalk the knife is moved so as to bring the cutting-edge thereof almost within the periphery of the supporting-disks, as indicated in dotted lines in Fig. 7, and at a very acute angle to the stalk with which it is to engage. As the knife is further revolved the cam projection $l^7$ releases the finger $l^3$, producing a quick outward, as well as upward, movement of said knife as the same strikes and enters the stalk, thus producing a quick thrust in the nature of a blow, which severs the stalk by a small portion of a revolution of said cutter and by an upward shearing cut. Any suitable number of cutters may be employed, two being shown in the drawings as the preferable number to be used, different positions of the cutters with reference to the cam projections being illustrated in dotted lines.

When the shock is formed in the manner before described by filling the different sections of the shocking platform or table and revolving the same within the stationary ring $G^2$, the machine is stopped and the shock bound and discharged in the following manner: The ring $G^2$ is preferably formed of flexible metal with inturned edges $m$, as shown in Fig. 14, the extremities of said ring being provided with screw-threaded handles $m'$ $m^2$, extending through the body of said ring. Within the ring $G^2$ and held in place by the inturned edges $m$ is a movable flexible open auxiliary ring $m^3$, having a projecting loop $m^5$ on one end thereof. This auxiliary ring $m^3$ is normally held within the outer ring $G^2$ with its extremities coincident with the extremities of the outer ring, the respective rings being held in this position by the screw-threaded handles, which are adapted to be forced against the inner ring, and thus clamp the same within the outer ring. The shock-sections being full, the end of the binding-cord $n$ on a spool $n'$, supported in a suitable position on the main frame, is connected in the loop $m^5$ of the inner flexible ring, which is released by the screw-threaded handles and turned within the outer ring, so as to carry the cord in around the shock until the loop $m^5$ comes substantially opposite the handle $m'$, the opening between the extremities of the outer ring being thus closed by the inner ring. In this position the handle $m'$ is tightened, clamping the inner ring firmly at this point. The handle $m'$ is then drawn toward the handle $m^2$, the inner ring sliding within the outer, and thus compressing the corn in the shock. When the handles are drawn together as closely as possible, the handle $m^2$ is also clamped against the inner ring, thus holding the shock firmly compressed while a sufficient amount of cord is cut off from the reel and the ends united, after which the parts are returned to their normal positions by loosening the respective handles $m'$ $m^2$. The inner ring is preferably provided with openings, as shown in Fig. 14, to permit the insertion of a finger or fingers of the operator or other projection in moving the said inner ring around within the outer ring.

As before stated, the stationary ring $G^2$ and the outer extremities of the movable projecting arms $C'$ are supported from an oscillating beam $G'$, pivoted in the center to a swivel-support $G^3$ on a two-part supporting-post $G^5$, the outer extremity of said oscillating beam $G'$ being connected by a rope $G^7$ to the main frame A A, which rope is made of a certain definite length to hold the shock-forming devices in their proper positions, and is arranged at any angle to said beam and to said post. The inner end of the oscillating beam is connected to the top of the central supporting-post $C'$ by a rope $G^{11}$. The parts of the supporting-post $G^5$ are preferably adapted to telescope one with the other, and are arranged with a pinion $o$ on one part adapted to engage in a rack $o'$ on the other part so as to shorten or lengthen said parts, as desired, the pinion $o$ being operated by a crank $o^2$. The supporting-post is arranged to the rear and at one side of the shock-forming platform, the rope $G^7$ being connected to the front of said platform, so that the supporting-post $G^5$ is elevated. The shock-forming devices are correspondingly elevated at the same time the supporting-beam $G'$ is caused to swing about the supporting post or swivel $G^3$. The central shock-supporting post $C'$ is also preferably formed in two parts, adapted to telescope together, the lower end of said post being removably supported in a socket on the revolving platform or table. The inner ends of each of the detachable radial projecting arms $c'$ are provided with upwardly-projecting fingers $c^2$, which normally engage in loops or staples $c^3$ in the central supporting-post $C'$. Immediately under the said arms is a movable collar or sleeve $C^2$, provided with a series of openings or notches $c^5$, corresponding in size and number to the arms $c'$. This collar $C^2$ is normally arranged so that the arms rest against the upper edge of said collar, but is adapted to be turned so as to bring the openings coincident with said arms, permitting said arms to drop into said openings, and thus withdraw the fingers $c^2$ from the loops or staples $c^3$ in the post. The movement of the collar $C^2$ necessary to accomplish this is preferably secured by a small bell-crank $c^7$, pivoted to the supporting-post $c'$ and connected at one end to an operating-cord $c^{11}$ and at the other resting between engaging projections on the collar, so that a longitudinal movement of the cord produces a rotary movement of the sleeve. This cord $c^{11}$ is extended up along the central supporting-post $C'$, over a swivel-pulley $c^{12}$ on the supporting-beam $G'$, and thence down along the supporting-post $G^5$ to within convenient reach of the operator. The shock being properly tied, as in the manner before described, the supporting-post $G^5$ is elongated by turning the crank $o^2$, thus raising the shock until the central post $C'$ is free from the socket, when said post and shock by the tension and angular position of the rope G⁷ will be swung rearwardly and outwardly so as to clear the main frame and at the same time be lowered and deposited on the ground to the rear of the binding-table and at one side of the main frame. It will be understood that the projecting arms $c$ and $c'$, engaging with the stalks and ears of corn packed therein, will hold the shock firmly united to the central post C'. When the shock is swung clear of the machine, by drawing upon the operating-cord $c^{11}$ the inner ends of the detachable arms are released, and by a continued movement of said cord the lower part of the central supporting-post is caused to telescope on the upper part. The shock is thus released and drops from the central post, while the inner ends of the detachable arms are also released, so that by further elevating the supporting-post G⁵ and telescoping the central post C' all the parts are drawn clear of the shock and the shock left standing on the ground, the detachable arms being suspended from their outer extremities by the suspending-cords $c^2$. The shock being thus deposited, all the parts are replaced in their normal positions by the operator and the operation completed.

It will be seen that by the constructions thus described means are provided for cutting, gathering, bunching, and binding the corn and depositing it in shocks at the side of the main frame.

As arranged I have provided for propelling the machine from the rear, a suitable tongue L being extended from the main frame in the rear of the revolving table or platform on which the shock is formed. I preferably support the rear end of this tongue on a caster-wheel D³, which also carries the weight of the driver, the seat E being arranged immediately above the said caster-wheel. I preferably connect the doubletree L' by means of a flexible rope or chain L² to a spring L³, secured to the rear of the main frame, said rope or chain passing over a suitable pulley or sheave L⁵, located in the tongue, means being thus provided whereby a yielding strain is secured on the doubletree, and at the same time, the hitch being below the tongue, the tongue is forced downwardly by the pressure exerted on the doubletree.

The upper radial projecting arms $c\ c$, described as "stationary arms," are preferably hinged at their inner ends and adapted to be held in their normal positions by springs $c^{25}$, as shown in Fig. 1, so that as the shock is discharged the arms may be depressed to permit the shocks to be released therefrom and returned automatically to their normal positions, or they may be formed of resilient wire to accomplish the same result.

On the upper end of the supporting-post G⁵, I provide a projecting stud or spur $p$, adapted to prevent the revolution of the supporting-beam until said beam is raised above said arm or spur, so that the shock will be elevated above the table and clear the same before the beam begins to swing backwardly and outwardly, as before described.

I preferably provide on the main frame A A about the revolving table C a projection C³, which projects a short distance above the floor on the table or platform, and thus retains the lower ends of the incoming stalks as the table is revolved. I also preferably provide on that side of the gathering-point B¹² toward which the platform or table revolves a compressing-wheel C⁵, journaled loosely on a suitable spindle or stud on the main frame, and adapted as the table is revolved to compress the lower ends of the stalks inward toward the supporting-post C', and thus more firmly compress the shock upon the table within the annular flange C⁸.

Figure 19:
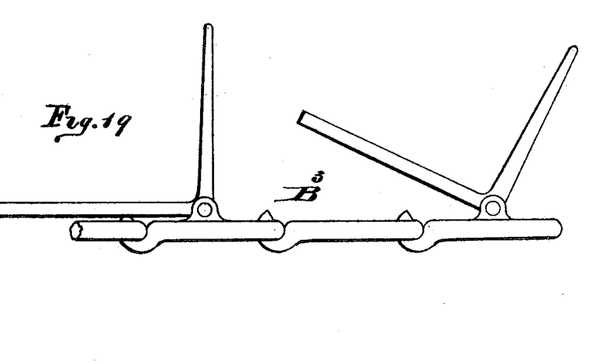
Fig. 19 is a detail of the gathering platform.

I preferably provide the carrying-chains with hinged or falling teeth constructed in a well-known manner, as shown in Fig. 19, to permit said chains to clear themselves at the point of discharge from the stalks carried thereby.

It is obvious that the various constructions described for producing the different operations may be modified from those shown and described without departing from the spirit of my invention. I do not, therefore, limit myself to the exact constructions; but

I claim—

1. In a harvester, the reciprocating packers pivoted at one end to a revolving crank and provided with a slotted opening to receive a supporting-pivot and means for automatically changing the position of said supporting-pivot, substantially as specified.

2. In a harvester, a reciprocating packer pivotally connected at one end to a revolving crank-shaft and a movable pivot operated by the revolution of said crank-shaft to automatically change the travel of said packer, substantially as specified.

3. In a harvester, a reciprocating packer having a slotted opening and a crank pin or shaft extending through said opening to form a pivotal point for said packer, a revolving crank-shaft connected to the end of said packer to cause it to reciprocate and oscillate about said pivotal point, and means for revolving the shaft which carries said pivotal point to automatically change the travel of said packer, substantially as specified.

4. In a harvester, the reciprocating packers, each supported on parallel crank-shafts, one of said crank-shafts being adapted to extend through a slotted bearing and act as a pivotal support for said packers and the other to produce a rotary reciprocating movement thereof, and means for producing a partial revolution of said supporting crank-shaft by the revolution of the operating crank-shaft, substantially as specified.

5. In a corn-harvester, the combination, with a revolving table or bundling-platform containing subdivisions, as described, of reciprocating packers adapted to operate adjacent to said table and means for automatically changing the stroke of said packers with reference to said table, substantially as specified.

6. The combination of an intermittently-revolving table and the reciprocating packers adapted to operate adjacent to said table, said packers being provided with automatically-moving supporting-bearings to change the stroke thereof with reference to said table, a continuously-revolving mechanism for operating said packers, and an intermediate normally-stationary mechanism for connecting said table to said revolving mechanism, and a connection from said movable packer-bearings to said intermediate mechanism, adapted by the movement of said packer-bearings to cause said intermediate mechanism to engage with the continuously-revolving driving mechanism to produce a portion of a revolution of said table, substantially as specified.

7. The combination of an intermittently-revolving table and the reciprocating packers arranged adjacent thereto, said packers being supported on movable bearing-supports to change the stroke thereof with reference to said table, said movable bearing-supports being automatically operated by the reciprocating mechanism for said packers, and means, substantially as described, for returning said pivotal supports to their normal position, and at the same time effecting a partial revolution of said table, substantially as specified.

8. The combination, with a revolving table having subdivisions adapted to be successively filled, as described, of a continuously-operating shaft normally disconnected from said table, a clutch mechanism for throwing said revolving shaft into engagement with said table, and stop projections on said table for disconnecting said clutch when said table has moved a portion of a revolution equal to one subdivision thereof, substantially as specified.

9. The combination, with a movable table having subdivisions, as described, of a continuously-revolving shaft normally disconnected from said table, a clutch mechanism adapted to connect and disconnect said revolving shaft with said table to produce a revolution thereof, stop projections on said table for withdrawing and holding said clutch mechanism out of engagement, and means for automatically releasing said clutch from said stop projections to produce a partial revolution of said table, substantially as specified.

10. The combination, with a table, a revolving shaft, and a clutch mechanism adapted to connect said table with said shaft, of a pivoted clutch-lever operated by stop projections on said table to release said clutch, said clutch-lever being pivoted to a movable support, and means for moving said pivotal support to produce a longitudinal movement of said clutch-lever, and thus release the same from said stop projections, substantially as specified.

11. The combination, with a revolving table and a central supporting-post thereon, of removable radial projecting arms having flexible supports at their outer extremities and normally connected to said central post at their inner extremities, and means, substantially as described, for detaching their inner extremities and releasing them from said post, substantially as specified.

12. The combination of detachable radial projecting arms and a central supporting-post, said arms being provided with upwardly-projecting fingers engaging in loops or sockets in said post, and movable supports under said arms, adapted to be simultaneously moved to release said arms, substantially as specified.

13. The combination of radial projecting arms detachably connected to a central post, as described, a movable collar on said post, adapted to support said arms in engagement with said post, and an operating-cord adapted by a longitudinal movement to move said collar, so as to release said arms and also elevate said post, substantially as specified.

14. The combination of an outer stationary ring and an inner movable ring and means for clamping said outer and inner rings together at different points, substantially as specified.

15. The combination of an outer stationary open flexible ring having therein an inner movable ring adapted to be moved so as to close said opening in said outer ring, and means for connecting the extremities of said outer ring to said inner ring, whereby the outer ring may be closed together to compress the shock formed therein and be held in a closed position by said inner ring, substantially as specified.

16. The combination of the outer open flexible ring $G^2$, having the screw-threaded handles $m'$ $m^2$, and the inner movable flexible ring $m^3$, adapted to be engaged by said handles, substantially as specified.

17. The combination of an outer stationary flexible ring and an inner movable flexible ring, said movable inner ring having a projecting cord-attaching loop, as described, and means for clamping said inner ring to said outer ring at different points, substantially as specified.

18. The combination of a movable shock-forming table or platform having subdivisions, as described, a central supporting-post on said platform, a stationary ring supported above said table from an oscillating beam, means for connecting said beam to said post, a normally-stationary connecting-rope extending from said beam at an angle to the plane of the shock-supporting post, and an extensible supporting-post having a swiveled support for said beam, substantially as specified.

19. The combination of a movable table having subdivisions, as described, and a normally-stationary ring suspended over said table, radial projecting arms detachably connected at their inner ends to a supporting-post, and means for suspending the extremities of said arms from said ring-supports, substantially as specified.

20. In a cutter for harvesters, a revolving shaft having end disks thereon, pivoted knives in said end disks, arms connected with said knives, and stationary cams adapted to operate said arms to change the angular position of said knives, substantially as specified.

21. The combination, with a revolving table, of a stationary projecting flange about said table and an independently-revolving compressing-wheel, the inner periphery of which is within said flange, substantially as specified.

In testimony whereof I have hereunto set my hand this 16th day of January, A. D. 1891.

ALVIE V. KISER.

Witnesses:
PAUL A. STALEY,
CHAS. I. WELCH.